United States Patent [19]

Shepley et al.

[11] Patent Number: 5,501,728
[45] Date of Patent: Mar. 26, 1996

[54] FRICTION MATERIAL

[75] Inventors: Christopher C. Shepley; David R. Carter, both of Cartersville, Ga.

[73] Assignee: Brake Pro, Inc., Cartersville, Ga.

[21] Appl. No.: 278,748

[22] Filed: Jul. 22, 1994

[51] Int. Cl.$^6$ .................................................. C09K 3/14
[52] U.S. Cl. ........................... 106/36; 523/149; 75/229; 75/246; 75/231; 75/234; 75/233; 75/230
[58] Field of Search ...................... 106/36; 75/229, 75/246, 231, 234, 273, 230; 523/149

[56] References Cited

U.S. PATENT DOCUMENTS

| | | | |
|---|---|---|---|
| 1,845,855 | 2/1932 | Ulam et al. | 523/153 |
| 2,052,779 | 9/1936 | Lidkea et al. | 106/7.5 |
| 2,951,053 | 8/1960 | Reuter et al. | 260/28 |
| 4,093,578 | 7/1978 | Vasiliev et al. | 260/28 |
| 4,178,278 | 12/1979 | Reynolds, Jr. | 106/36 |
| 4,654,381 | 3/1987 | Kang et al. | 523/149 |
| 4,656,203 | 4/1987 | Parker | 523/155 |
| 4,663,368 | 5/1987 | Harding et al. | 523/155 |
| 4,672,082 | 6/1987 | Nakagawa et al. | 523/153 |
| 5,004,497 | 4/1991 | Shibata et al. | 75/229 |

*Primary Examiner*—C. Melissa Bonner
*Attorney, Agent, or Firm*—Harness, Dickey & Pierce

[57] ABSTRACT

The present invention relates to a friction material for use in manufacturing various friction bearing components such as brakes, clutches, couplings, transmission systems and the like. The composition of the friction material includes a base friction material and a metal sulfide-iron powder alloy mixture which is added to the base material and further mixed prior to compression molding the desired component.

15 Claims, No Drawings

FRICTION MATERIAL

BACKGROUND OF THE INVENTION

I. Technical Field

This invention relates to friction materials for improving wear resistance and reducing noise levels between high load bearing friction surfaces, and more particularly, for mechanical structures such as brakes, couplings, clutches and transmission systems, among others.

II. Discussion

Friction materials have been utilized for a number of years in industries such as the automotive component industry. Materials used in such friction coatings include, for example, graphite, ceramic powders, metal or metal oxide powders, heat hardenable phenolic resins, asbestos fibers, glass and carbon fibers, aramid fibers, steel wool, bentonite, mica and diatomaceous materials, among others. Typically, such friction materials are used to form molded friction bearing components.

By way of example U.S. Pat. No. 5,004,497 which issued Apr. 2, 1991 to Shibata et al. relates to a friction material containing 0.85 to 30% by weight of carbon fibers and 2 to 20% by weight of aramid fibers, wherein the aramid fibers preferably consist of para-aramid fibers and/or a combination of chopped aramid fibers and fibrillar aramid fibers Another friction material is disclosed in U.S. Pat. No. 4,777,193 which issued Oct. 11, 1988 to Kani. The Kani patent discloses a molded resin composite of friction material for use in clutches of automobiles or similar parts, wherein the composition comprises inert fiber, a resin binder, an organic filler, and an inert filler wherein the inert filler contains zirconium silicate in an amount of from between about 0.1 to about 5.0% by volume based on 100% by volume of the total composition.

Still another friction material is disclosed in U.S. Pat. No. 4,654,381 which issued Mar. 31, 1987 to Kang et al. The compositions disclosed are characterized by the addition of any one of more than two cermet powders selected from the group consisting of (a) a powdered cermet comprising 75 to 50% by weight of a blended carbonaceous material and 25 to 50% by weight of the stainless steel alloyed iron; (b) a powdered cermet comprising 75 to 50% by weight of a blended carbonaceous material and 25 to 50% by weight of tungsten alloyed iron and/or molybdenum alloyed iron; and (c) a powdered cermet comprising 75 to 50% by weight of a blended carbonaceous material and 25 to 50% by weight of metallic iron; wherein the blended carbonaceous material is a mixture of 90 to 70% by weight of oil coats and 10 to 30% by weight of graphite with the cermet powder being added to the composition in an amount of 15 to 40% by weight based on the total weight of the composition.

None of the art known to the Applicant specifically relates to friction materials wherein metal sulfides are alloyed with iron powder with the resulting alloy being added to various metal based compounds commonly used for friction bearing components.

It is therefore an object of the present invention to provide an improved friction material which offers both friction stability and noise reducing capabilities.

It is another object of the present invention to provide a friction material which is durable in use.

It is still another object of the present invention to provide a friction material which provides wear resistance to both the friction bearing surface and the opposing contact surface.

According to the present invention, there is provided a friction material which includes the incorporation of metal sulfides alloyed with iron powders, wherein the resulting alloys are added to various metal based friction material compounds to provide a friction material with enhanced friction stability. This improved friction stability will generally be reflected in greater wear resistance along both the friction bearing surface and the opposing contact surface. Among the many metal sulfides which have proven useful, manganese sulfide has proven to be particularly useful.

According to a preferred embodiment of the present invention, a base friction material comprises between about 85% to about 99% by weight of a compound including varying amounts of pulp, steel fibers, iron powders, carbon, inert fillers and phenolic resins and about 1% to about 15% by weight of a metal sulfide—iron powder alloy. The metal sulfides which are alloyed with iron powder using known techniques generally include $ZnS$, $FeS$, $MoS_2$, $CuS_2$, $TiS$, $CdS$, $Sb_2S_3$, $MnS$, $CoS$, $Co_3S_4$, $CaS$, $BaS$, $SrS$, $FeS_2$, $ZrS_2$, $Cu_2S$, $Ni_3S_2$, $NiS$, $Ni_3S_4$, $MnS_2$, $CoS_2$, $CoS_2S_3$, $SnS$.

The constituents of the base friction material are typically commercially available from a number of different sources. The metal sulfide-iron powder alloy can be introduced either as is or in the form of an admixture with other materials such as solid lubricants including antimony sulfide and aluminum phosphate, among others.

Further objects of the present invention reside in the method of utilizing the metal sulfide-iron powder alloy in the formation of friction bearing components.

The advantages of the present invention will become better understood by reference to the following detailed description.

DETAILED DESCRIPTION OF THE PREFERRED EMBODIMENT

A friction material for use in forming friction bearing components comprises a base friction material including a mixture of pulp, steel fibers, iron powder, carbon, inert fillers and binders and an admixture of a metal sulfide-iron powder alloy. An important aspect of the present invention is that the metal sulfide-iron powder alloy can be added in an amount up to about 15% by weight.

The binders useful in accordance with the teachings of the present invention are mainly composed of resins prepared through condensation of one or more types of phenol or cresol, with formaldehyde based compounds. Although various modified phenolic resins are useful under the present invention such as those modified with various vegetable oils or epoxy compounds, unmodified phenolic resins are preferred.

The amount of binders included within the base friction material includes between about 8% to about 30% by weight of final composition, more preferably between about 10% to about 25% and highly preferably between about 12% to about 20% by weight. In general, amounts below 8% by weight give rise to a relatively weak material and in contrast weight percentages over about 30% affect the acceptable porosity and anti-fading properties of the friction material.

The inert fillers of the present invention are typically present in the range of between about 5% to about 20% by weight of the final composition. Under a more preferred embodiment the range is between about 7% to about 16% by weight, and, under a highly preferred embodiment the range is between about 8% to about 14% by weight of the final composition. While a number of commercially available inert fillers are useful under the present invention, barytes, clays, whiting and talc have proven to be particularly useful.

Among the various forms of carbon which are useful according to the teachings of the present invention amorphous and crystalline forms of carbon such as petroleum coke, metallurgical coke, various purified synthetic carbon materials and naturally occurring graphites are particularly useful. Typically, the amount of carbon utilized under the present invention ranges from between about 6% to about 30% by weight. Under more highly preferred embodiments this range is from about 10% by weight to about 25% by weight, and under the most preferred embodiments this range is from 12% to about 20% by weight of the overall composition.

Various types of fibrous materials are also included within the composition of the present invention. Among the acceptable fibers are one or more fibers including but not limited to glass fibers, ceramic fibers, silica fibers, aluminum fibers, carbon fibers, metallic fibers, mineral fibers and mixtures thereof. Highly preferred forms of fibers include aramid and acrylic based reticulated fibers, otherwise known as pulp. Two forms of aramid fibers which are highly preferred, include KEVLAR® fibers available from E. I. Dupont du Numours, Co. of Wilmington, Del. and TWARON® fibers available from Enka, Inc. of Atlanta, Ga. Among the preferred acrylic fibers, one known as CFF-110-1 which is available from Cytec Industries, Inc. and another known as JM190 which is available from Mann Industries have proven to be useful.

Another highly preferred form of fibrous material useful under the present invention is steel fibers such as commercial grade steel wool. While commercial grade steel wool is readily available from a number of different sources the steel fibers used to prepare example formulations under the present invention were purchased from American Metal Fibers Incorporated.

Typically, the amount of fibrous material utilized in accordance with the teachings of the present invention ranges from about 10% to about 65% by weight of the overall composition. Under more preferred embodiments this amount ranges from about 20% to about 50% and under highly preferred embodiments the amount of fibrous material utilized will typically range from about 30% to about 45% by weight of the overall composition.

Among the various iron powders which are useful in preparing the friction material of the present invention those known as LD-80, P100 and R12 which are available from Pyron, Inc. of Niagara Falls, N.Y. have proven to be particularly useful. Typically, the iron metal powder utilized will have a particle size ranging from between about 35 and about 325 mesh, as tested under a common mesh screen analysis.

The iron powder included within the base friction material is generally present in an amount between about 10% to about 35% based on the overall weight of the composition. More preferably, the amount of iron powder utilized in the base friction material is from about 12% to about 30% and still more preferably from about 15% to about 25% based on the total weight of the final friction material composition.

In addition to the aforementioned constituents which are utilized to form the base friction material of the present invention, a metal sulfide-iron powder alloy is formed by conventional alloying techniques and added to the base friction material to complete the composition.

Among the various metal sulphide-iron powder alloys which are useful in preparing the friction material of the present invention one known as MP37R which is available from DOMFER Metal Powders, Ltd. of Montreal, Quebec, Canada has proven to be particularly useful.

Ideally, the metal sulphide-iron powder utilized will have a particle size of between about 60 and about 325 mesh, as tested under a common mesh screen analysis. According to the manufacturer's specifications, the MP37R metal sulfide-iron powder alloy, as utilized to conduct noise evaluations as set forth in Tables I, II and III, includes, on an elemental basis, approximately 0.007 wt.% carbon; 0.40 wt.% oxygen; 0.23 wt.% sulfur; 0.017 wt.% phosphorous; 0.82 wt.% manganese; 0.09 wt.% silicon and 0.23 wt.% acid insolubles, with the remainder being iron powder, i.e. 98.206 wt.%. The average weight percentage of metal sulfide contained in the MP37R utilized to conduct the noise evaluations can thus be obtained by the stoichiometric calculation:

$$\frac{\text{atm. wt. S}}{\text{atm. wts. Mn + S}} \text{ or } \frac{32.066}{54.938 + 32.066} = 0.369.$$

The average weight percentage of MnS can then be determined by the equation:

$$\frac{\text{wt. \% S}}{0.369} \text{ or } \frac{0.23 \text{ wt. \% S}}{0.369} = 0.623 \text{ wt \% MnS}$$

According to the manufacturer's specifications, the range of sulfur contained in the metal sulfide constituent may vary from between about 0.20 to about 0.30 wt.%. Thus, since virtually all of the sulfur contained in the metal sulfide-iron powder alloy is bonded with the manganese constituent in the form of manganese sulfide, the percentage of metal sulfide contained in the metal sulfide-iron powder alloy will typically range from about 0.542 to 0.813 wt.% according to the calculation set forth above.

Typically, the percentage of metal sulfides, such as manganese sulfide, in metal sulfide-iron powder alloys is on the order of less than one percent based on the total weight of the alloy.

This metal sulfide-iron powder alloy is typically present in an amount of between about 1% to about 15% based on a total weight percentage of the final composition. Under preferred embodiments this amount is typically in the range of between 2% to about 12% and under highly preferred embodiments from between about 3% to about 8% by weight of the final composition.

The method of manufacturing a friction bearing component such as an automotive vehicle brake pad using the compositions according to the teaching of the present invention involve a conventional manufacturing process known as compression molding. Initially, the base friction materials including the fibrous materials, carbonaceous materials, inert fillers, iron powder and resin type powdery binders are admixed under continuous stirring within the mixing vessel. Subsequently, the metal sulfide-iron powder alloy is added to the base material and the overall composition is thoroughly mixed. Once the composition is fully mixed an amount of the material sufficient to mold the desired component is pre-shaped by molding under a pressure of approximately 150 kg/cm$^2$ at room temperature within a press mold. Thereafter, the preform molded product is further molded by subjecting it to pressure of 400 kg/cm$^2$ at a temperature of approximately 150° C. for approximately 8 minutes. Finally, the molding is released from the die and heated for approximately 12 hours at a temperature of 180° C. After the heated molding cools to approximately room temperature and any necessary final machining and assembly is done, the component may be applied to the automotive vehicle.

Utilizing this manufacturing method, a number of test examples in the form of automotive brakes were prepared both including and excluding the metal sulfide-iron powder alloy as shown in Table I.

2,500 miles and to assign a numerical value corresponding to a perceived noise level during a number of applications. According to the chart set forth in Table II, a rating of 1 indicates that the noise level is unacceptably loud and a rating of 10 indicates that virtually no audible noise was detected. It should be noted that while less subjective testing procedures are available, the test set forth in Table II is commonly used in industry to evaluate noise levels for friction bearing products such as automobile brakes.

TABLE II

| Brake Noise Evaluation Scale | | | |
|---|---|---|---|
| Rating | Noise Level | Complaint | Occurrence |
| 10 | None | No One | Never |
| 9 | Slight | Expert Only | Very Infrequent Not Reproducible |
| 8 | Moderate | Critical | Infrequent |
| 7 | Objectionable | Driver | Difficult to Reproduce |
| 6 | Very Objectionable | Average Driver | Frequent Easily Reproducible |
| 5 | Intolerable | | |
| 4 | | | |
| 3 | | | |
| 2 | | Every Driver | Every Application |
| 1 | | | |

TABLE I

| INGREDIENTS (based on total weight % of the composition) | EXAMPLE 1 | EXAMPLE 2 | EXAMPLE 3 | EXAMPLE 4 |
|---|---|---|---|---|
| Pulp | 0.5 | 0.5 | 0.5 | 0.5 |
| Steel fiber | 40.7 | 39.2 | 40.2 | 39.3 |
| Iron powder | 22.6 | 21.8 | 22.4 | 21.2 |
| Carbonaceous material | 14.0 | 13.4 | 13.8 | 12.5 |
| Inert fillers | 8.8 | 8.5 | 8.7 | 8.3 |
| Binders | 13.4 | 13.0 | 14.4 | 14.6 |
| Metal sulfide/iron alloy (i.e. MP37R) | — | 3.6 | — | 3.6 |
| | 100.0 | 100.0 | 100.0 | 100.0 |

The brake pads were applied to various automotive vehicles and each vehicle was driven over a fixed route of 2500 miles during which 5,000 to 10,000 brake applications or stops were performed as a means of testing for noise. Using the chart set forth in Table II below, individuals were asked to apply the brakes of the vehicle while driving the The results for each example formulation is set forth in Table III below. As can be seen from a review of Table III the friction materials which included amounts of the metal sulfide-iron powder alloys received higher ratings than those excluding the metal sulfide-iron powder alloys of the present invention.

TABLE III

| VEHICLE | EXAMPLE FORMULATION NO. | 2500 mi AVG NOISE RATING | WORST NOISE RECORDED |
|---|---|---|---|
| 1992 FORD F-250 PICKUP | 1 | 9.0 | 7.0 |
| | 2 | 10.0 | 9.9 |
| 1987 OLDSMOBILE CUTLASS CIERA | 1 | 8.5 | 6.0 |
| | 4 | 10.0 | 9.0 |
| 1987 MERCURY SABLE | 3 | 9.5 | 7.0 |
| | 4 | 9.8 | 8.0 |

TABLE III-continued

| VEHICLE | EXAMPLE FORMULATION NO. | 2500 mi AVG NOISE RATING | WORST NOISE RECORDED |
|---|---|---|---|
| 1986 BUICK | 1 | 8.8 | 7.0 |
| PARK AVENUE | 2 | 9.9 | 8.0 |
| 1985 CHRYSLER | 3 | 9.0 | 7.0 |
| FIFTH AVENUE | 2 | 9.5 | 7.0 |
| | AVG. WITHOUT METAL SULFIDE-IRON POWDER ALLOY: | 9.0 | 6.8 |
| | AVG. WITH METAL SULFIDE-IRON POWDER ALLOY: | 9.8 | 8.4 |

In general, during the 2500 mile test the incidence of objectionable noise increases as the test progresses. That is, the lower noise rating values (i.e. more noise) are usually recorded towards the end of the test. While average noise ratings are shown, the inclusion of the metal sulphide-iron alloy in the formulation suppresses the rate of increase in objectionable noise incidence with time, as evidenced by the smaller difference between the average and worst noise recorded for those formulas containing the metal sulphide-iron alloy as compared with those formulas where the metal sulphide-iron alloy is absent.

While it will be apparent that the preferred embodiments of the invention disclosed are well calculated to provide the advantages stated above, it will be appreciated that the invention is susceptible to modification, variation and change without departing from the proper scope and fair meaning of the following claims.

By including an effective amount of metal sulfide-iron powder alloy, the audible noise level was significantly reduced.

What is claimed is:

1. A friction material useful for enhancing the wear resistance between contacting surfaces, comprising:
   a base friction material including fibrous material, carbonaceous material, iron powder, inert fillers and binders; and
   a metal sulfide-iron powder alloy.

2. The friction material of claim 1, wherein the metal sulfide utilized to form the alloy is selected from the group consisting of $ZnS$, $FeS$, $MoS_2$, $CuS_2$, $TiS$, $CdS, Sb_2S_3$, $MnS$, $CoS$, $Co_3S_4$, $CaS$, $BaS$, $SrS$, $FeS_2$, $ZrS_2, Cu_2S$, $Ni_3S_2$, $NiS$, $Ni_3S_4$, $MnS_2$, $CoS_2$, $Co_2S_3$, and $SnS$.

3. The friction material of claim 1, wherein said base friction material is present in an amount of at least 85% based on weight, with the remainder being a metal sulfide-iron powder alloy.

4. The friction material of claim 3, wherein said base friction material comprises:
   (a) about 10% to about 65% by weight of fibrous materials;
   (b) about 6% to about 30% by weight of carbonaceous material;
   (c) about 10% to about 35% by weight of iron powder;
   (d) about 5% to about 20% by weight of inert filler; and
   (e) about 8% to about 30% by weight of binders.

5. The friction material of claim 4, wherein said fibrous material is selected from the group consisting of acrylic fibers, aramid fibers, glass fibers, silica fibers, carbon fibers, metallic fibers, mineral fibers and mixtures thereof.

6. The friction material of claim 4, wherein said carbonaceous material is selected from the group consisting of petroleum coke, metallurgical coke, natural carbon, synthetic carbon and mixtures thereof.

7. The friction material of claim 4, wherein said inert fillers are selected from the group consisting of whiting, talc, barytes, clays and mixtures thereof.

8. The friction material of claim 4, wherein said binder is a resinous binder.

9. A friction material useful for enhancing the wear resistance, comprising:
   a base friction material including:
   (a) about 10% to about 65% by weight of fibrous materials;
   (b) about 6% to about 30% by weight of carbonaceous material;
   (c) about 10% to about 35% by weight of iron powder;
   (d) about 5% to about 20% by weight of inert filler;
   (e) about 8% to about 30% by weight of binders; and
   a metal sulfide-iron powder alloy;
   wherein the base friction is present in an amount of at least 85% based on the overall weight of the composition.

10. The friction material of claim 9, wherein the metal sulfide utilized to form the alloy is selected from the group consisting of $ZnS$, $FeS$, $MoS_2$, $CuS_2$, $TiS$, $CdS, Sb_2S_3$, $MnS$, $CoS$, $Co_3S_4$, $CaS$, $BaS$, $SrS$, $FeS_2$, $ZrS_2, Cu_2S$, $Ni_3S_2$, $NiS$, $Ni_3S_4$, $MnS_2$, $CoS_2$, $Co_2S_3$, and $SnS$.

11. The friction material of claim 10, wherein said fibrous material is selected from the group consisting of acrylic fibers, aramid fibers, glass fibers, silica fibers, carbon fibers, metallic fibers, mineral fibers and mixtures thereof.

12. The friction material of claim 10, wherein said carbonaceous material is selected from the group consisting of petroleum coke, metallurgical coke, natural carbon, synthetic carbon and mixtures thereof.

13. The friction material of claim 10, wherein said inert fillers are selected from the group consisting of whiting, talc, barytes, clays and mixtures thereof.

14. The friction material of claim 10, wherein said binder is a resinous binder.

15. A friction material useful for enhancing wear resistance, comprising: at least 85 wt.% of a base friction material including:
   (a) about 10% to about 65% by weight of fibrous materials;
   (b) about 6% to about 30% by weight of carbonaceous material;
   (c) about 10% to about 35% by weight of iron powder;
   (d) about 5% to about 20% by weight of inert filler;
   (e) about 8% to about 30% by weight of binders; and up to 15 wt.% of metal sulfide-iron powder alloy.

* * * * *